US011940828B2

(12) United States Patent
Huang et al.

(10) Patent No.: US 11,940,828 B2
(45) Date of Patent: Mar. 26, 2024

(54) VOLTAGE TRACKING CIRCUITS WITH LOW POWER CONSUMPTION AND ELECTRONIC CIRCUITS USING THE SAME

(71) Applicant: Vanguard International Semiconductor Corporation, Hsinchu (TW)

(72) Inventors: Shao-Chang Huang, Hsinchu (TW); Yeh-Ning Jou, Hsinchu (TW); Ching-Ho Li, Hsinchu (TW); Kai-Chieh Hsu, Taoyuan (TW); Chun-Chih Chen, New Taipei (TW); Chien-Wei Wang, Taoyuan (TW); Gong-Kai Lin, Yilan County (TW); Li-Fan Chen, Hsinchu (TW)

(73) Assignee: VANGUARD INTERNATIONAL SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/889,685

(22) Filed: Aug. 17, 2022

(65) Prior Publication Data

US 2024/0061455 A1 Feb. 22, 2024

(51) Int. Cl.
*G05F 1/571* (2006.01)

(52) U.S. Cl.
CPC .................................... *G05F 1/571* (2013.01)

(58) Field of Classification Search
CPC ....................................................... G05F 1/571
See application file for complete search history.

(56) References Cited

U.S. PATENT DOCUMENTS

2010/0163973 A1* 7/2010 Nakamura .......... H01L 27/0635 438/237
2011/0235454 A1* 9/2011 Huang ................. H03K 17/693 327/434
2012/0322247 A1* 12/2012 Chang ............... H01L 29/66568 438/514
2022/0416778 A1* 12/2022 Huang ................. H03K 17/161

* cited by examiner

*Primary Examiner* — Jue Zhang
*Assistant Examiner* — Lakaisha Jackson
(74) *Attorney, Agent, or Firm* — Birch, Stewart, Kolasch & Birch, LLP

(57) ABSTRACT

A voltage tracking circuit is provided. The voltage tracking circuit includes first and second P-type transistors and a control circuit. The drain of the first P-type transistor is coupled to a first voltage terminal. The gate and the drain of the second P-type transistor are respectively coupled to the first voltage terminal and a second voltage terminal. The control circuit is coupled to the first and second voltage terminals and generates a control voltage according to the first voltage and the second voltage. The sources of the first and second P-type transistors are coupled to an output terminal of the voltage tracking circuit, and the output voltage is generated at the output terminal. In response to the second voltage being higher than the first voltage, the control circuit generates the control signal to turn off the first P-type transistor.

22 Claims, 10 Drawing Sheets

VOLTAGE TRACKING CIRCUITS WITH LOW POWER CONSUMPTION AND ELECTRONIC CIRCUITS USING THE SAME

BACKGROUND OF THE INVENTION

Field of the Invention

The present invention relates to a voltage tracking circuit, and more particularly to a voltage tracking circuit with low power consumption.

Description of the Related Art

Generally, when an N-type metal oxide semiconductor (NMOS) transistor is used on the high-voltage side of an electronic circuit, an over-voltage event may occur on its source/bulk. This causes the parasitic bipolar diode of the NMOS transistor to be turned on, which induces a leakage current. The leakage current may cause the electronic circuit to overheat, damaging the electronic circuit. Therefore, how to reduce the amount of leakage current caused by overvoltage is an important issue.

BRIEF SUMMARY OF THE INVENTION

An exemplary embodiment of the present invention provides a voltage tracking circuit for tracking a first voltage at a first voltage terminal or a second voltage at a second voltage terminal to generate an output voltage. The voltage tracking circuit comprises a first P-type transistor, a second P-type transistor, and a control circuit. The first P-type transistor has a gate, a drain, and a source. The drain of the first P-type transistor is coupled to the first voltage terminal. The second P-type transistor has a gate, a drain, and a source. The gate of the second P-type transistor is coupled to the first voltage terminal, and the drain of the second P-type transistor is coupled to the second voltage terminal. The control circuit is coupled to the first voltage terminal and the second voltage terminal and generates a control voltage according to the first voltage and the second voltage. The source of the first P-type transistor and the source of the second P-type transistor are coupled to an output terminal of the voltage tracking circuit, and the output voltage is generated at the output terminal. In response to the second voltage being higher than the first voltage, the control circuit generates the control signal to turn off the first P-type transistor.

An exemplary embodiment of the present invention provides an electronic circuit. The electronic circuit comprises a high-voltage-side element and a voltage tracking circuit. The high-voltage-side element has a first electrode terminal and a second electrode terminal and is surrounded by an isolated deep well region. The voltage tracking circuit is coupled to the first electrode terminal and the second electrode terminal. The voltage tracking circuit tracks a first voltage at the first electrode terminal or a second voltage at the second electrode terminal to generate an output voltage at an output terminal. The voltage tracking circuit applies the output voltage to the isolated deep well region surrounding the high-voltage-side element. The voltage tracking circuit comprises a first P-type transistor, a second P-type transistor, and a control circuit. The first P-type transistor has a gate, a drain, and a source. The drain of the first P-type transistor is coupled to the first electrode terminal. The second P-type transistor has a gate, a drain, and a source. The gate of the second P-type transistor is coupled to the first electrode terminal, and the drain of the second P-type transistor is coupled to the second electrode terminal. The control circuit is coupled to the first electrode terminal and the second electrode terminal and generates a control voltage according to the first voltage and the second voltage. The source of the first P-type transistor and the source of the second P-type transistor are coupled to the output terminal of the voltage tracking circuit, and the output voltage is generated at the output terminal. In response to the second voltage being higher than the first voltage, the control circuit generates the control signal to turn off the first P-type transistor.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated model of carrying out the invention. This description is made for the purpose of illustrating the general principles of the invention and should not be taken in a limiting sense. The scope of the invention is best determined by reference to the appended claims.

Figure 1:
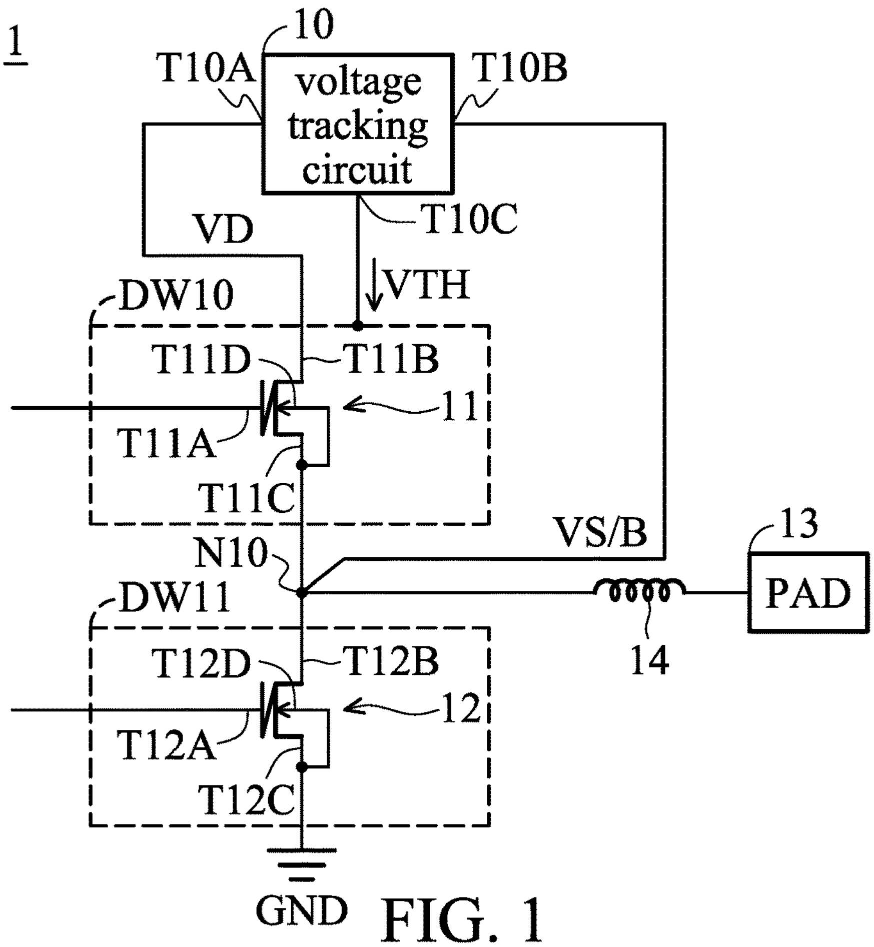
FIG. 1 shows an electronic circuit of an embodiment of the present invention.

FIG. 1 shows an electronic circuit according to an embodiment of the present invention. Referring to FIG. 1, an electronic circuit 1 comprises a voltage tracking circuit 10, an N-type metal oxide semiconductor (NMOS) transistor 11 located on the high-voltage side (i.e., a high-voltage-side element), an NMOS transistor 12 on the low-voltage side (i.e., a low-voltage side element), an input/output pad (PAD) 13, and an inductor 14. In the embodiment, the NMOS transistors 11 and 12 are N-type laterally diffused metal oxide semiconductor (LDMOS) transistors, and each is surrounded by an N-type isolated deep well region. For example, in FIG. 1, the element reference "DW10" represents the N-type isolation deep well region surrounding the LDNMOS transistor 11, and the element reference "DW11" represents the N-type isolation deep well region surrounding the LDNMOS transistor 12.

The LDNMOS transistor 11 comprises four electrode terminals T11A-T11D, which are a gate T11A, a drain T 11B, a source T11C, and a bulk T11D, respectively. The gate T11A receives a signal generated from another component in the electronic circuit 1. The drain T11B is coupled to a voltage terminal T10A of the voltage tracking circuit 14. The source T11C and the bulk T11D are coupled together at a node N10. A voltage terminal T11B of the voltage tracking circuit 14 is coupled to the node N10, which means it is coupled to the source T11C and the bulk T11D (the source/bulk T11C/T11D). The LDNMOS transistor 12 comprises four electrode terminals T12A-T12D, which are a gate T12A, a drain T12B, a source T12C, and a bulk T12D, respectively. The gate T12A receives a signal generated from another component in the electronic circuit 1. The drain T12B is coupled to the node N10. Both the source T12C and the bulk T12D are coupled to a ground terminal GND. The inductor 14 is coupled between the node N10 and the input/output pad 13.

Referring to FIG. 1, the voltage terminal T11A of the voltage tracking circuit 10 is coupled to the drain T11B of the LDNMOS transistor 11, and the voltage terminal T11B thereof is coupled to the source TiiC and the bulk TiiD of the LDNMOS transistor 11. When the electronic circuit 1 operates, the voltage tracking circuit 10 generates an output voltage VTH at an output terminal T10C based on whichever one has the higher level: the voltage VD at the drain T11B and the voltage VS/B at the source T11C and the bulk T11D. In other words, the voltage tracking circuit 10 tracks the one with the higher level (the voltage VD at the drain T11B or the voltage VS/B at the source T11C and the bulk T11D) and outputs the output voltage VTH that is equal to the tracked voltage. Therefore, the voltage tracking circuit 10 can change the output voltage VTH according to the voltages VD and VS/B.

The voltage tracking circuit 10 provides the generated output voltage VTH to the N-type isolated deep well region DW10 surrounding the LDNMOS transistor 11. In some cases, when an overvoltage event occurs at the I/O pad 13, the voltage VS/B increases through the inductor 14 to be higher than the voltage VD. At this time, the output voltage VTH increases with the voltage VS/B due to the operation of the voltage tracking circuit 10. In response to an increase in the output voltage VTH, the parasitic bipolar transistor related to the N-type isolated deep well region DW10 can be turned off, or the turned-on efficiency of the parasitic bipolar transistor related to the N-type isolated deep well region DW10 can be reduced, thereby avoiding or reducing leakage currents. According to the above description, using the voltage tracking circuit 14 to control the output voltage VTH applied to the N-type isolated deep well region DW10 can prevent the high temperatures caused by leakage currents from damaging the electronic components in the electronic circuit 1.

Various embodiments and the operation of the voltage tracking circuit 10 are described below.

Figure 2:
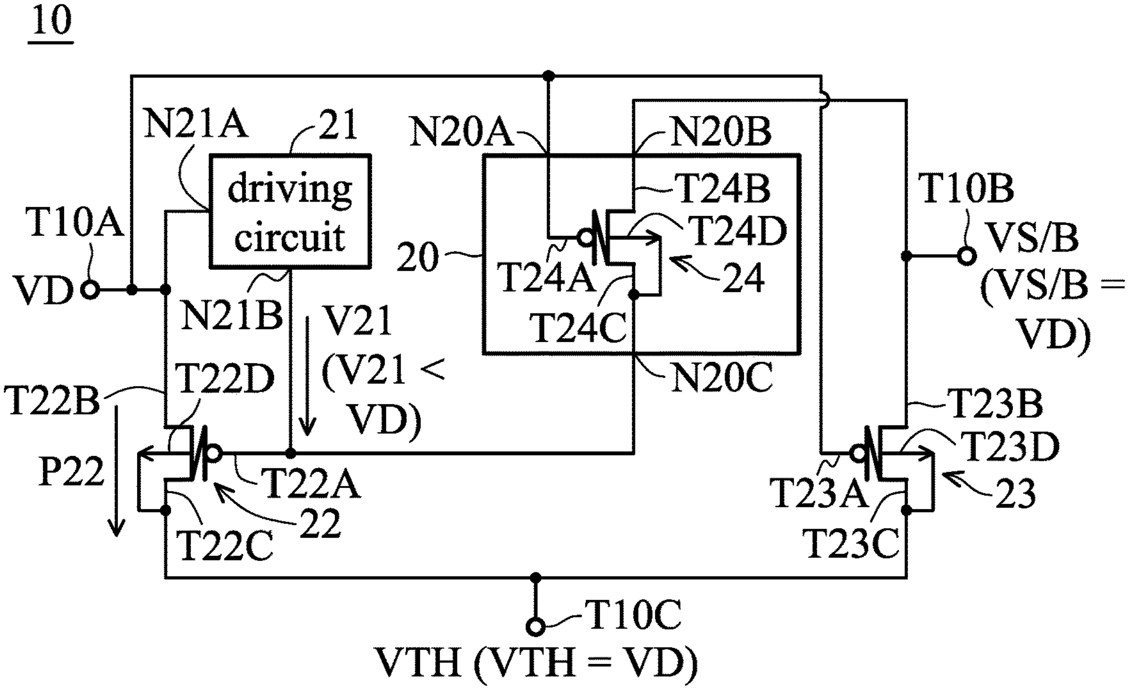
FIG. 2 is a schematic diagram showing an operation of a voltage tracking circuit in FIG. 1 under a first voltage condition according to an embodiment of the present invention.
Figure 3:
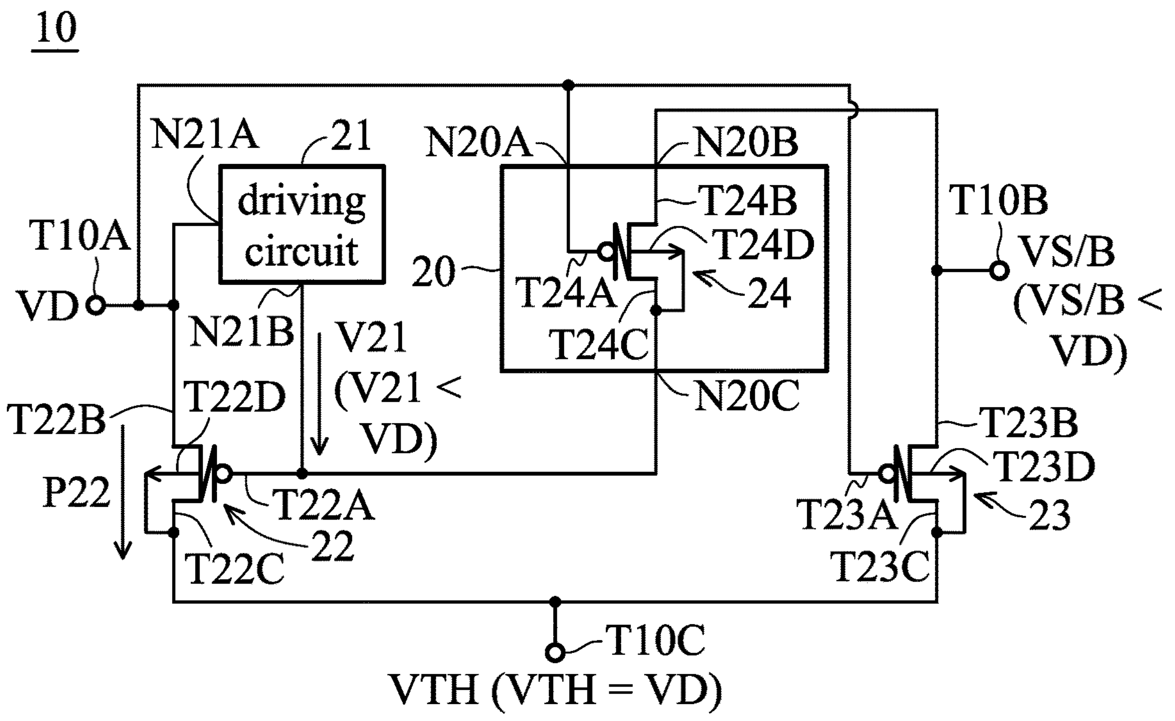
FIG. 3 is a schematic diagram showing an operation of a voltage tracking circuit in FIG. 1 under a second voltage condition according to an embodiment of the present invention.
Figure 4:
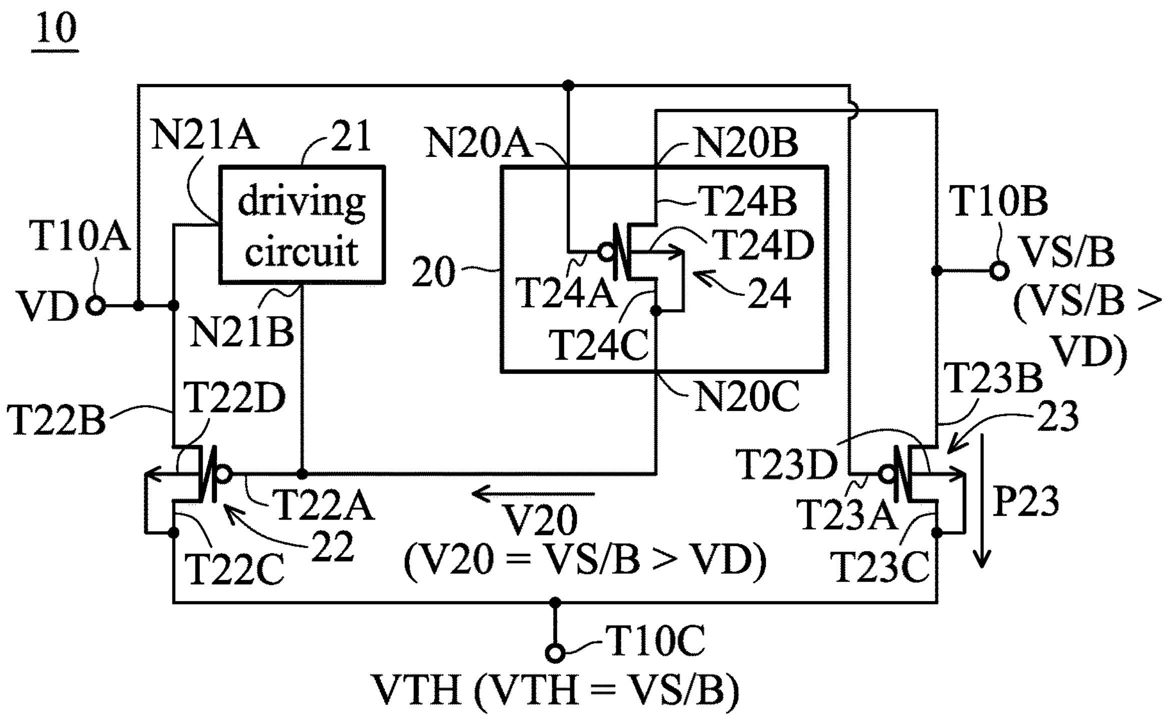
FIG. 4 is a schematic diagram showing an operation of a voltage tracking circuit in FIG. 1 under a third voltage condition according to an embodiment of the present invention.

FIGS. 2-4 are schematic diagrams showing the operation of the voltage tracking circuit in FIG. 1 under different voltage conditions according to an embodiment of the present invention. In the following, the circuit structure of the voltage tracking circuit 10 is described by referring to FIG. 2. As shown in FIG. 2, the voltage tracking circuit 10 comprises a control circuit 20, a driving circuit 21, and P-type metal oxide semiconductor (PMOS) transistors 22 and 23. The PMOS transistor 22 comprises four electrode terminals T22A-T22D, which are a gate T22A, a drain T22B, a source T22C, and a bulk T22D, respectively. The drain T22B is coupled to the voltage terminal T10A, and the source T22C and the bulk T22D are coupled to the output terminal T10C. The driving circuit 21 comprises an input node N21A and an output node N21B. The input node N21A is coupled to the voltage terminal T10A, and the output node N21B is coupled to the gate T22A of the PMOS transistor 22. The PMOS transistor 23 comprises four electrode terminals T23A-T23D, which are a gate T23A, a drain T23B, a source T23C, and a bulk T23D, respectively. The gate T23A is coupled to the voltage terminal T10A, the drain T23B is coupled to the voltage terminal T10B, and the source T23C and the bulk T23D are coupled to the output terminal T10C.

The control circuit 20 comprises input nodes N20A and N20B and an output node N20C. The input node N20A is coupled to the voltage terminal T20A, the input node N20B is coupled to the voltage terminal T10B, and the output node N20C is coupled to the gate T22A of the PMOS transistor 22. In the embodiment, the control circuit 20 comprises a PMOS transistor 24. The PMOS transistor 24 comprises four electrode terminals T24A-T24D, which are a gate T24A, a drain T24B, a source T24C, and a bulk T24D, respectively. The gate T24A is coupled to the input node N20A, the drain T24B is coupled to the input node N20B, and the source T24C and the bulk T24D are coupled to the output node N20C.

Referring to FIG. 2, when the electronic circuit 1 operates, the voltage tracking circuit 10 receives the voltage VD through the power terminal T10A and further receives the voltage VS/B through the power terminal T10B. In the embodiment of FIG. 2, the voltage VS/B is equal to the voltage VD (VS/B=VD). For example, both the voltage VD and the voltage VS/B are 44V. At this time, the PMOS transistor 23 is turned off. The driving circuit 21 provides a modulation voltage. When the driving circuit 21 receives the voltage VD through the input node N21A, the driving circuit 21 performs a voltage reducing operation to reduce the voltage VD by the modulation voltage and generate a driving voltage V21 at the output node N21B. In other words, the driving circuit 21 generates the driving voltage V21 according to the voltage VD, and the driving voltage V21 is lower than the voltage VD (V21<VD). For example, the modulation voltage is 2.1V, and the driving voltage V21 is 41.9V. At this time, the voltage of the gate T22A of the PMOS transistor 22 is equal to the driving voltage V21. Since the driving voltage V21 is lower than the voltage VD, the PMOS transistor 22 is turned on to provide a current path P22. Through the current path P20 passing through the PMOS transistor 22, the output voltage VTH at the output terminal T10C follows the voltage VD and increases with the voltage VD. Finally, the output voltage VTH is equal to the voltage VD (VTH=VD=44V).

Moreover, when the voltage VS/B is equal to the voltage VD (VS/B=VD), the control circuit 20 blocks any current path between the input node N20B and the output node N20C according to the voltage VD. The PMOS transistor 24 is turned off according to the voltage VD, so that there is no current path between the drain T24B and the source T24C. Accordingly, the driving voltage V21 can be stably maintained at a level of, for example, 41.9V, so that the turned-on state of the PMOS transistor 22 is not affected by the voltage VS/B.

Referring to FIG. 3, in some cases, the voltage VS/B is lower than the voltage VD (VS/B<VD). For example, the voltage VD is 44V while the voltage VS/B is 0V. At this time, the PMOS transistor 23 is turned off. The driving circuit 21 performs the voltage reducing operation to reduce the voltage VD by the modulation voltage to generate the driving voltage V21 at the output node N21B. The driving voltage V21 is lower than the voltage VD (V21<VD). For example, the driving voltage V22 is 41.9V. At this time, the voltage of the gate T22A of the PMOS transistor 22 is equal to the driving voltage V21. Since the driving voltage V21 is lower than the voltage VD, the PMOS transistor 22 is turned on to provide the current path P22. Through the current path P22, the output voltage VTH at the output terminal T10C follows the voltage VD and increases with the voltage VD. Finally, the output voltage VTH is equal to the voltage VD (VTH=VD=44V).

Moreover, when the voltage VS/B is lower than the voltage VD (VS/B<VD), the control circuit 20 blocks any current path between the input node N20B and the output node N20C according to the voltage VD. The PMOS transistor 24 is turned off according to the voltage VD, so that there is no current path between the drain T24B and the source T24C. Accordingly, the driving voltage V21 can be stably maintained at a level of, for example, 41.9V, so that the turned-on state of the PMOS transistor 22 is not affected by the voltage VS/B.

Referring to FIG. 4, in some cases, the voltage VS/B is higher than the voltage VD (VS/B>VD). For example, the voltage VD is 44V while the voltage VS/B is 46.5V. At this time, the PMOS transistor 23 is turned on to provide a current path P23 between the voltage terminal T10B and the output terminal T10C. Through the current path P23, the output voltage VTH at the output terminal T10C follows the voltage VS/B and increases with the voltage SS/B. Finally, the output voltage VTH is equal to the voltage VS/B (VTH=VS/B=46.5V).

Moreover, when the voltage VS/B is higher than the voltage VD (VS/B>VD), the control circuit 20 provides a current path between the input node N20B and the output node N20C according to the voltage VD. Thus, the control circuit 20 provides a control voltage V20, and the control voltage V20 is equal to the voltage VS/B (46.5V). The PMOS transistor 24 is turned on according to the voltage VD, so that there is a current path between the drain T24B and the source T24C. Accordingly, the control voltage V20 is equal to the voltage VS/B (V=VS/B>VD). At this time, although the driving circuit 21 also performs the above-mentioned voltage reducing operation, since the control circuit 20 provides the higher control voltage V20 of 46.5V, the PMOS transistor 22 is in a turned-off state in this case. In other words, the control circuit 20 turns off the PMOS transistor 22. Based on the turned-off state of the PMOS transistor 22, even if the output voltage VTH (46.5V) is higher than the voltage VD (44V), the leakage current from the output terminal T10C to the voltage terminal T10A will not be generated. By turning off the PMOS transistor 22 using the control circuit 20, the output voltage VTH can be stably maintained at the level of the voltage VS/B, meaning it is stably maintained at 46.5V.

According to the above embodiment, the voltage tracking circuit 10 generates the output voltage VTH at the output terminal T10C based on whichever one (voltage VD or voltage VS/B) has a higher level. In this way, the output voltage VTH follows the one with the higher level (voltage VD or voltage VS/B). Due to the operation of the control circuit 20, the output voltage VTH can be stably maintained at the level of the one (voltage VD or voltage VS/B) with the higher level. Moreover, when voltage VS/B is higher than voltage VD (VS/B>VD), the control circuit 20 blocks any current path between the input node N20B and the output node N20C, which reduces power consumption.

The driving circuit 21 in the embodiment comprises a plurality of voltage reducing elements connected in series between the input node N21A and the output node N21B, thereby achieving the voltage reducing operation. There are several implementations for the voltage reducing elements. A detailed description of the structure of the driving circuit 21 is described below and illustrated in FIGS. 5-7.

Figure 5:
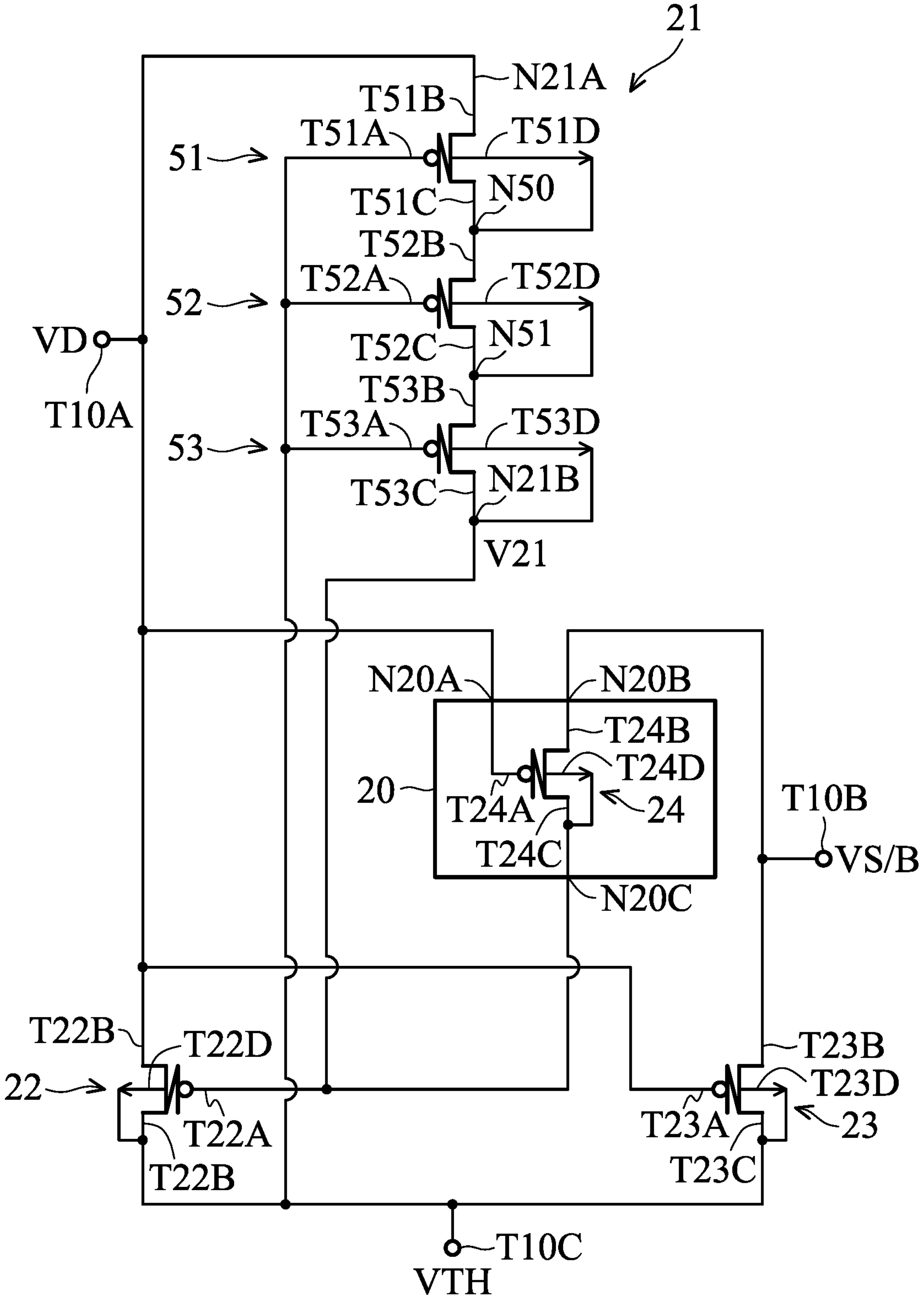
FIG. 5 shows the voltage tracking circuit in FIGS. 2-4 according to an embodiment of the present invention, and a voltage reducing circuit in the voltage tracking circuit has a first structure.

FIG. 5 shows the voltage tracking circuit 10 according to an embodiment of the present invention, in which the driving circuit 21 has a first structure. Referring to FIG. 5, the driving circuit 21 comprises PMOS transistors (voltage reducing elements) 51-53 connected in series between the input node N21A and the output node N21B. The number of PMOS transistors can be determined according to actual requirements for the modulation voltage. The present invention is not limited to cases where there are three PMOS transistors in the driving circuit 21. The PMOS transistor 51 has four electrode terminals T51A-T51D, which are a gate T51A, a drain T51B, a source T51C, and a bulk T51D, respectively. The drain T51B is coupled to the input node N21A. The source T51C and the bulk T51D are coupled to a node N50. The PMOS transistor 52 has four electrode terminals T52A-T52D, which are a gate T52A, a drain T52B, a source T52C, and a bulk T52D, respectively. The drain T52B is coupled to the node N50. The source T52C and the bulk T52D are coupled to a node N51. The PMOS transistor 53 has four electrode terminals T53A-T53D, which are a gate T53A, a drain T53B, a source T53C, and a bulk T53D, respectively. The drain T53B is coupled to the node N51. The source T53C and the bulk T53D are coupled to the output node N21B. The gates T51A, T52A, and T53A of the PMOS transistors 51-53 are coupled to the output terminal T10C.

For example, when the electronic circuit 1 operates, the voltage tracking circuit 10 receives the voltage VD through the power terminal T10A. The voltage VD is, for example, 44V, however, the present invention is not limited thereto. At this time, each of the PMOS transistors 51-53 is in a turned-off state. Since there are parasitic diodes in the PMOS transistors 51-53 respectively, each of the PMOS transistors 51-53 provides a cross-voltage of about 0.7V between drain and source thereof. Therefore, the voltage difference between the input node N21A and the output node N21B of the driving circuit 21 is about 2.1V (0.7V×3=2.1V). The voltage difference (2.1V) between the input node N21A and the output node N21B is used as the modulation voltage provided by the driving circuit 21. At this time, the driving voltage V21 at the output node N21B is equal to 41.9V (44V−2.1V=41.9V), thereby achieving the voltage reducing operation. That is, the voltage VD is reduced by the modulation voltage, and, thus, the driving voltage V21 is generated at the output node N21B after the reduction. In the embodiment, the output voltage VTH at the output terminal T10C follows the one with higher level among the voltage VD and the voltage VS/B. Thus, the gates T51A, T52A, and T52C of the PMOS transistors 51-53 have a higher voltage, such that each of the PMOS transistors 51-53 can be in the turned-off state stably.

Figure 6:
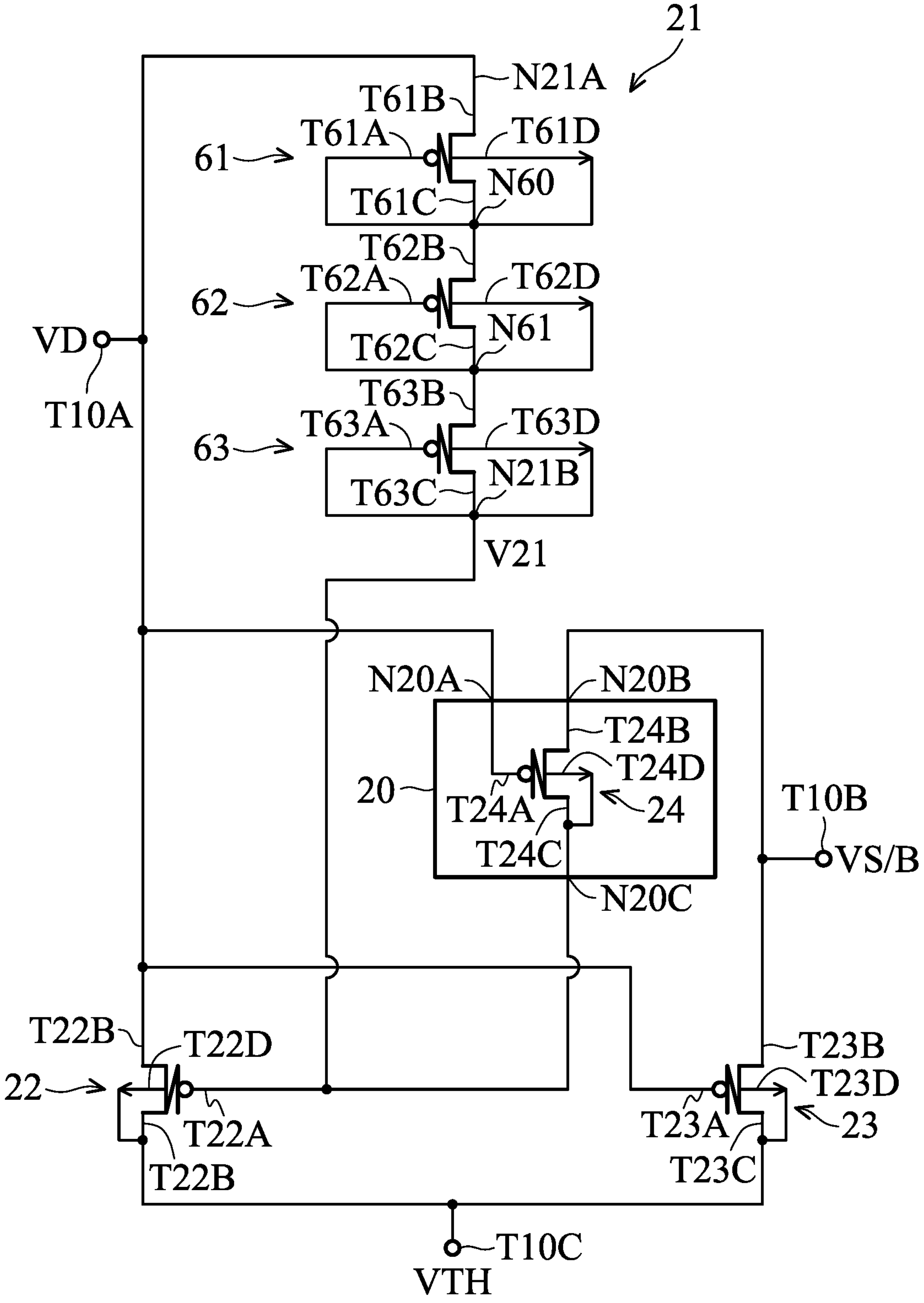
FIG. 6 shows the voltage tracking circuit in FIGS. 2-4 according to another embodiment of the present invention, and the voltage reducing circuit in the voltage tracking circuit has a second structure.

FIG. 6 shows the voltage tracking circuit 10 according to another embodiment of the present invention, in which the driving circuit 21 has a second structure. Referring to FIG. 6, the driving circuit 21 comprises PMOS transistors (voltage reducing elements) 61-63 connected in series between the input node N21A and the output node N21B. The number of PMOS transistors can be determined according to actual requirements for the modulation voltage. The present invention is not limited to cases where there are three PMOS transistors in the driving circuit 21. The PMOS transistor 61 has four electrode terminals T61A-T61D, which are a gate T61A, a drain T61B, a source T61C, and a bulk T61D, respectively. The drain T61B is coupled to the input node N21A. The gate T61A, the source T61C and the bulk T61D are coupled to a node N60. The PMOS transistor 61 has four electrode terminals T62A-T62D, which are a gate T62A, a drain T62B, a source T62C, and a bulk T62D, respectively. The drain T62B is coupled to the node N60. The gate T62A, the source T62C and the bulk T62D are coupled to a node N61. The PMOS transistor 63 has four electrode terminals T63A-T63D, which are a gate T63A, a drain T63B, a source T63C, and a bulk T63D, respectively. The drain T63B is coupled to the node N61. The gate T63A, the source T63C and the bulk T63D are coupled to the output node N21B.

For example, when the electronic circuit 1 operates, the voltage tracking circuit 10 receives the voltage VD through the power terminal T10A. The voltage VD is, for example, 44V, however, the present invention is not limited thereto. At this time, each of the PMOS transistors 61-63 is in a turned-off state. Since there are parasitic diodes in the PMOS transistors 61-63 respectively, each of the PMOS transistors 51-53 provides a cross-voltage of about 0.7V between drain and source thereof. Therefore, the voltage difference between the input node N21A and the output node N21B of the driving circuit 21 is about 2.1V (0.7V×3=2.1V). The voltage difference (2.1V) between the input node N21A and the output node N21B is used as the modulation voltage provided by the driving circuit 21. At this time, the driving voltage V21 at the output node N21B is equal to 41.9V (44V−2.1V=41.9V), thereby achieving the voltage reducing operation. That is, the voltage VD is reduced by the modulation voltage, and, thus, the driving voltage V21 is generated at the output node N21B after the reduction.

Figure 7:
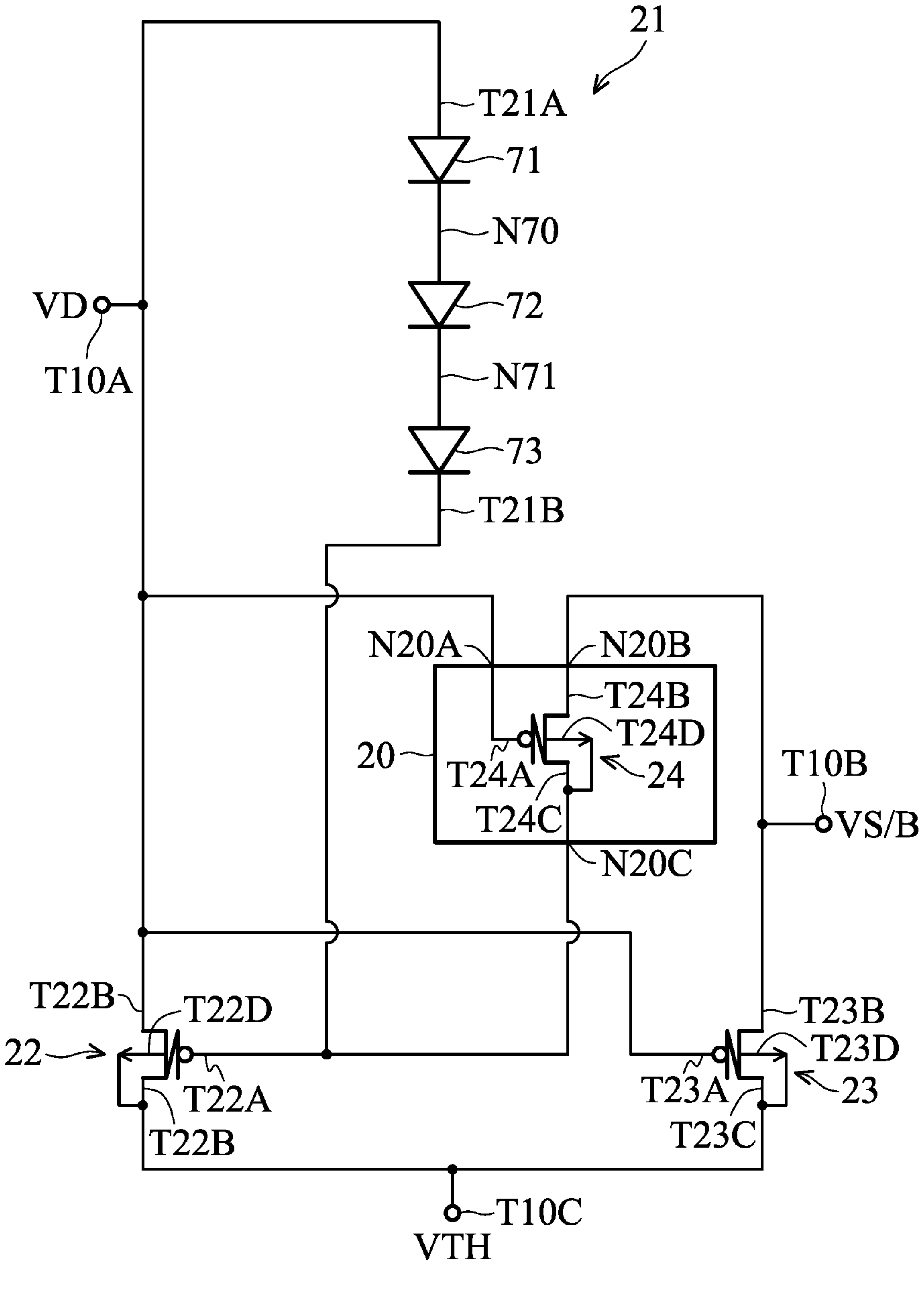
FIG. 7 shows the voltage tracking circuit in FIGS. 2-4 according to an embodiment of the present invention, and the voltage reducing circuit in the voltage tracking circuit has a third structure.

FIG. 7 shows the voltage tracking circuit 10 according to another embodiment of the present invention, in which the driving circuit 21 has a third structure. Referring to FIG. 7, the driving circuit 21 comprises diodes (voltage reducing elements) 71-73 connected in series between the input node N21A and the output node N21B. The number of the diodes can be determined according to actual requirements for the modulation voltage. The present invention is not limited to cases where there are three diodes in the driving circuit 21. The anode of the diode 71 is coupled to the input node N21A, and the cathode of the diode 71 is coupled to a node N70. The anode of the diode 72 is coupled to the node N70, and the cathode of the diode 72 is coupled to a node N71. The anode of the diode 73 is coupled to the node N71, and the cathode of the diode 73 is coupled to the output node N21B.

For example, when the electronic circuit 1 operates, the voltage tracking circuit 10 receives the voltage VD through the power terminal T10A. The voltage VD is, for example, 44V, however, the present invention is not limited thereto. At this time, each of the diodes 71-73 provides a cross-voltage of about 0.7V between the anode and the cathode thereof. Therefore, the voltage difference between the input node N21A and the output node N21B of the driving circuit 21 is 2.1V (0.7V×3=2.1V). The voltage difference (2.1V) between the input node N21A and the output node N21B is used as the modulation voltage provided by the driving circuit 21. At this time, the driving voltage V21 at the output node N21B is equal to 41.9V (44V−2.1V=41.9V), thereby achieving the voltage reducing operation. That is, the voltage VD is reduced by the modulation voltage, and, thus, the driving voltage V21 is generated at the output node N21B after the reduction.

Please refer to the description related to FIGS. 2-4, the operation of the voltage tracking circuit shown in each of FIGS. 5-7 is as described above, and, thus, the related description is omitted here.

In the above embodiments, in the voltage tracking circuit 10, only the PMOS transistor 23 is coupled between the voltage terminal T10B and the output terminal T10C. However, in other embodiments, another PMOS transistor can be connected to the PMOS transistor 23 in series between the voltage terminal T10B and the output terminal T10C.

Figure 8:
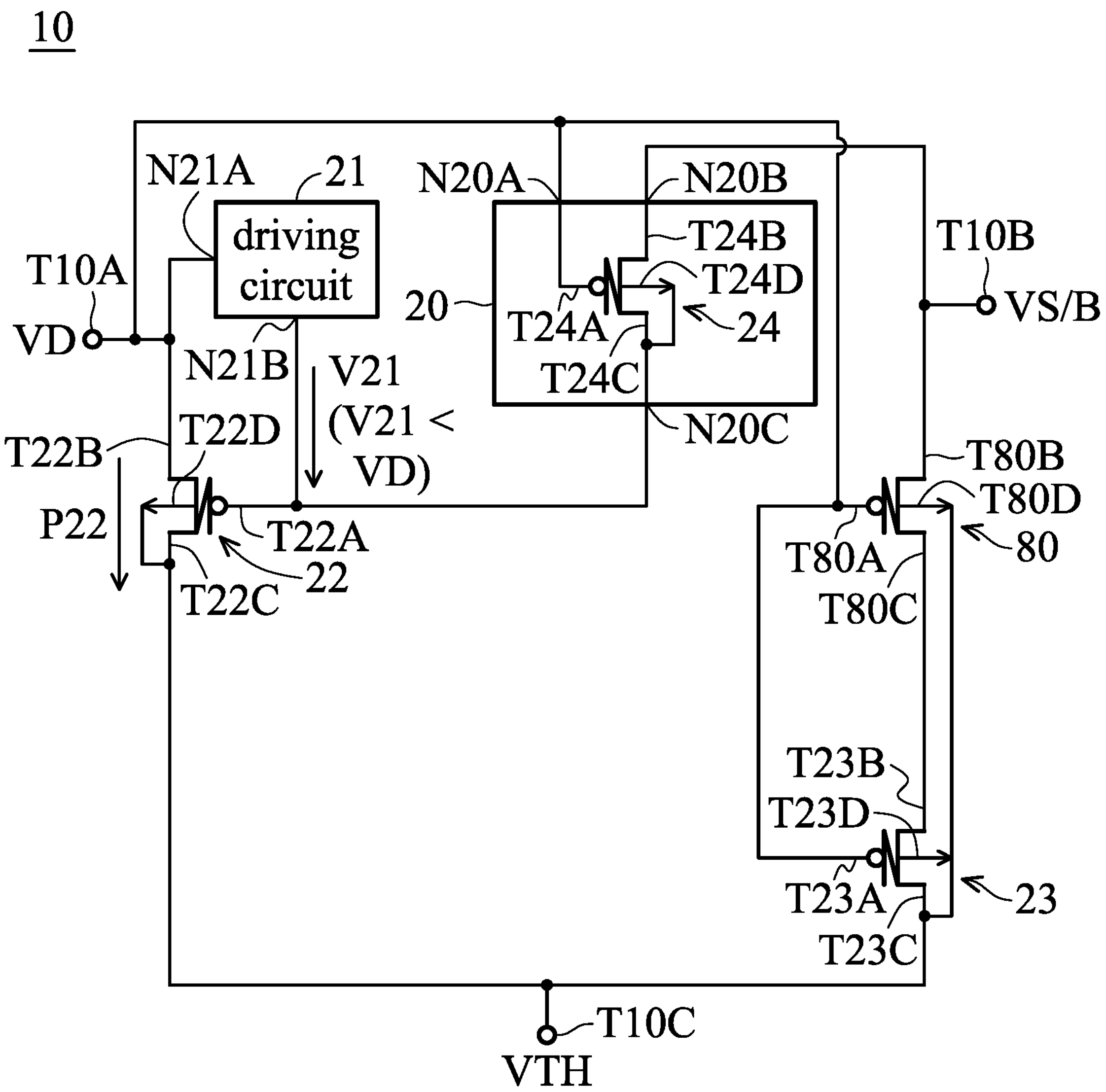
FIG. 8 shows the voltage tracking circuit of the electronic circuit in FIG. 1 according to another embodiment of the present invention.

Referring to FIG. 8, s PMOS transistor 80 and the PMOS transistor 23 are connected in series between the voltage terminal T10B and the output terminal T10C. The PMOS transistor 80 comprises four electrode terminals T80A-T80B, which are a gate T80A, a drain T80B, a source T80C, and a bulk T80D, respectively. The gate T80A is coupled to the voltage terminal T10A. The drain T80B is coupled to the voltage terminal T10B. The source T80C and the bulk T80D are coupled to the output terminal T10C. In the embodiment shown in FIG. 8, since the two PMOS transistors 80 and 23 are connected in series between the voltage terminal T10B and the output terminal T10C, a current path is provided between the voltage terminal T10B and the output terminal T10C only when the PMOS transistors 80 and 23 are both in the turned-on state, for example, the current path P23 shown in FIG. 4. In this way, when the voltage VS/B is lower than the voltage VD (VS/B<VD) or equal to the voltage VD (VS/B=VD), the current path between the voltage terminal T10B and the output terminal T10C can be blocked, so that the output voltage VTH at the output terminal T10C can accurately follow the voltage VD without being affected by the voltage VS/B.

Figure 9:
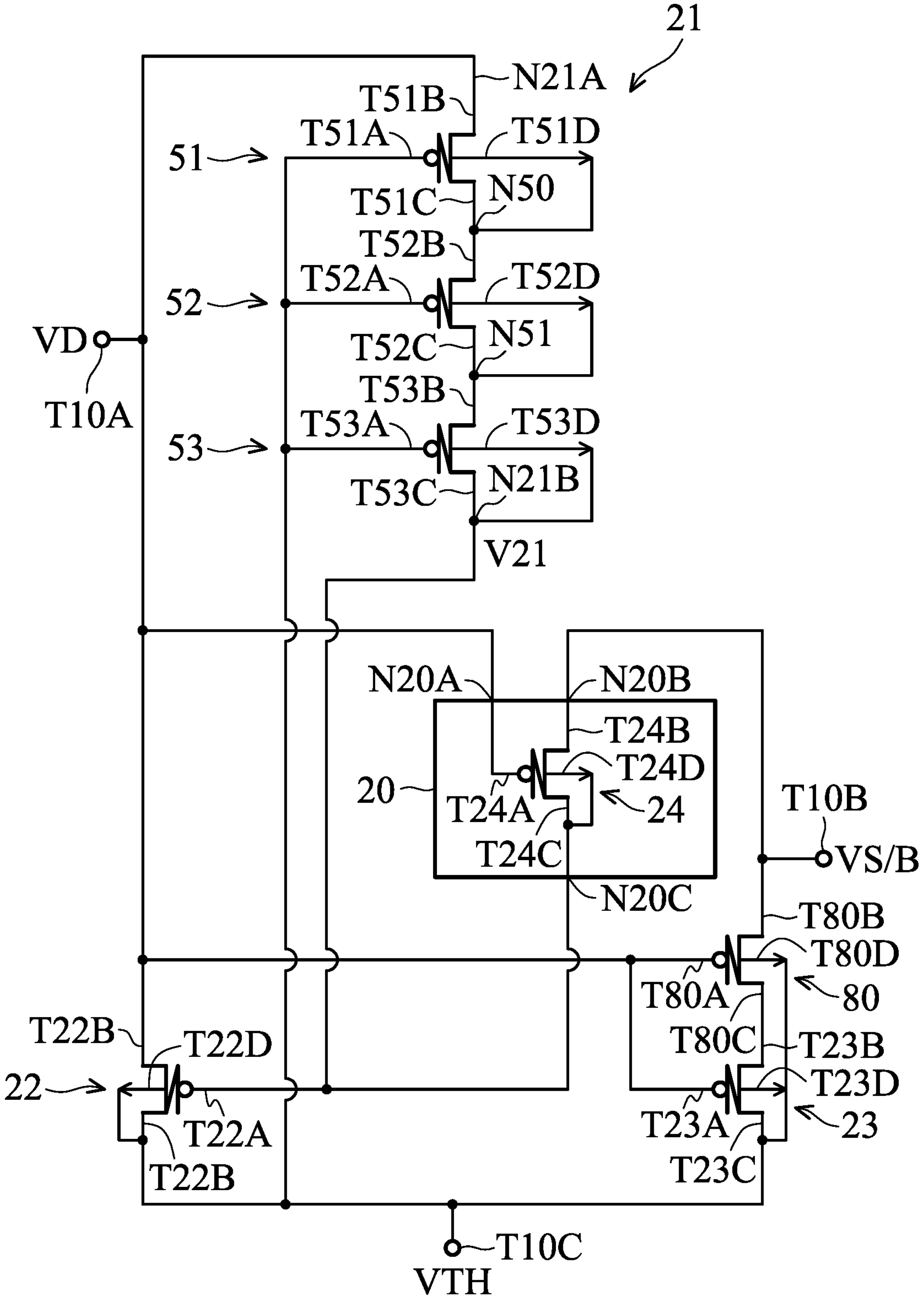
FIG. 9 shows the voltage tracking circuit in FIG. 8 according to an embodiment of the present invention, and the voltage reducing circuit in the voltage tracking circuit has the first structure.
Figure 10:
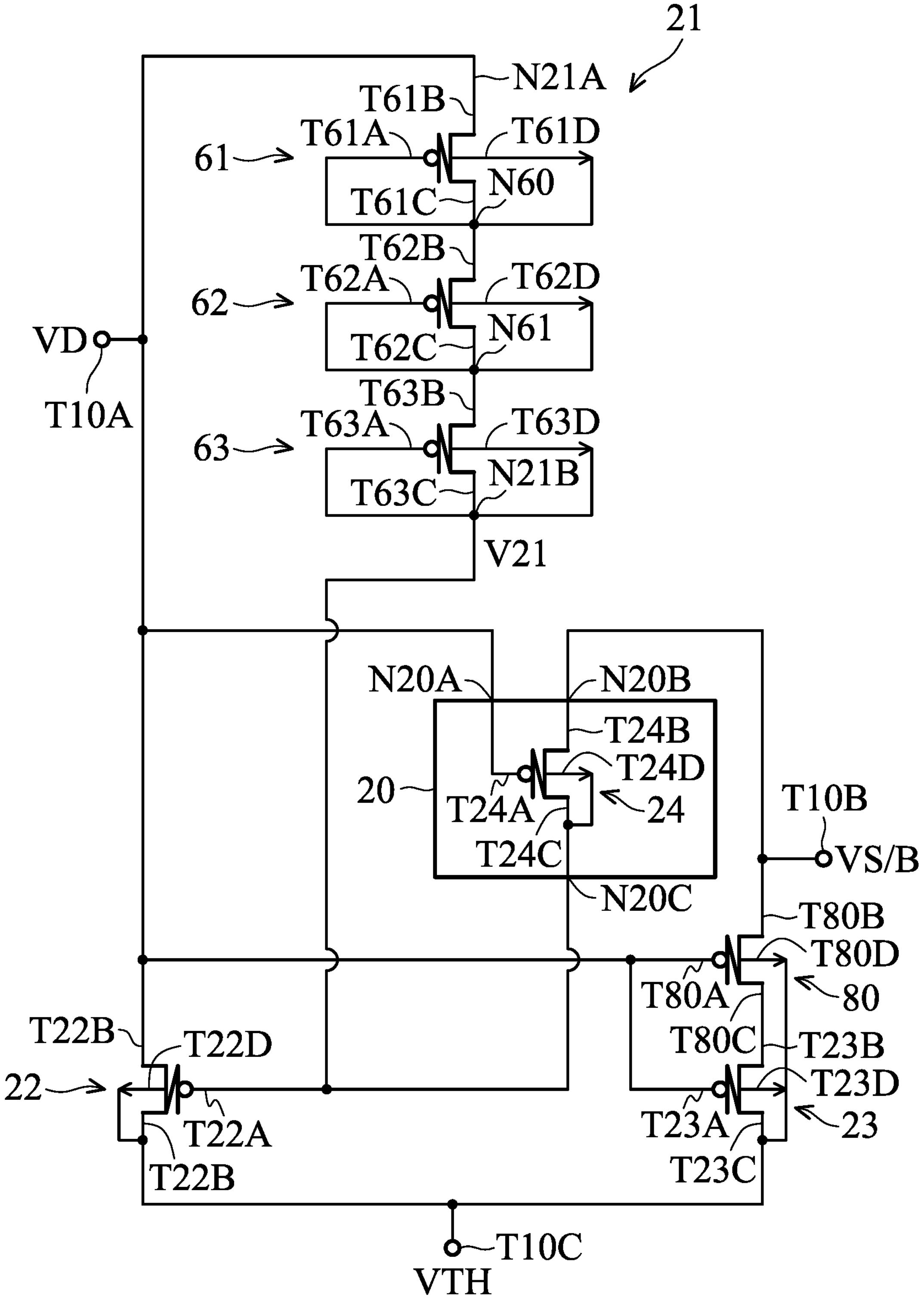
FIG. 10 shows the voltage tracking circuit in FIG. 8 according to another embodiment of the present invention, and the voltage reducing circuit in the voltage tracking circuit has a second structure.
Figure 11:
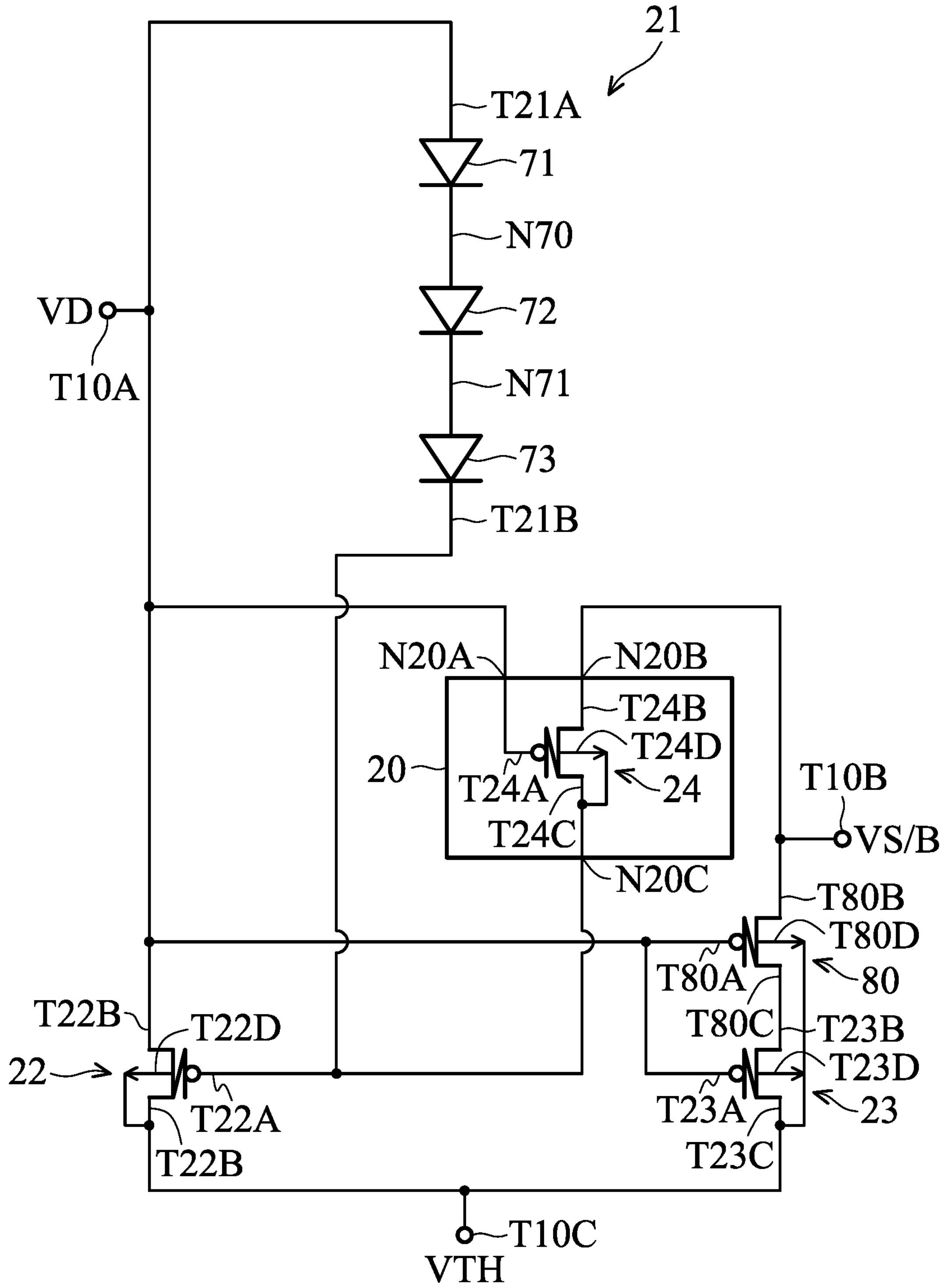
FIG. 11 shows the voltage tracking circuit in FIG. 8 according to another embodiment of the present invention, and the voltage reducing circuit in the voltage tracking circuit has a third structure.

Therefore, in the driving circuit 21 shown in each of FIGS. 3-5, the PMOS transistors 80 and 23 are connected in series between the voltage terminal T10B and the output terminal T10C, as shown in FIGS. 9-11, respectively. The operation of the voltage tracking circuit shown in each of FIGS. 9-11 is as described above, please refer to the description related to FIGS. 2-4.

Figure 12:
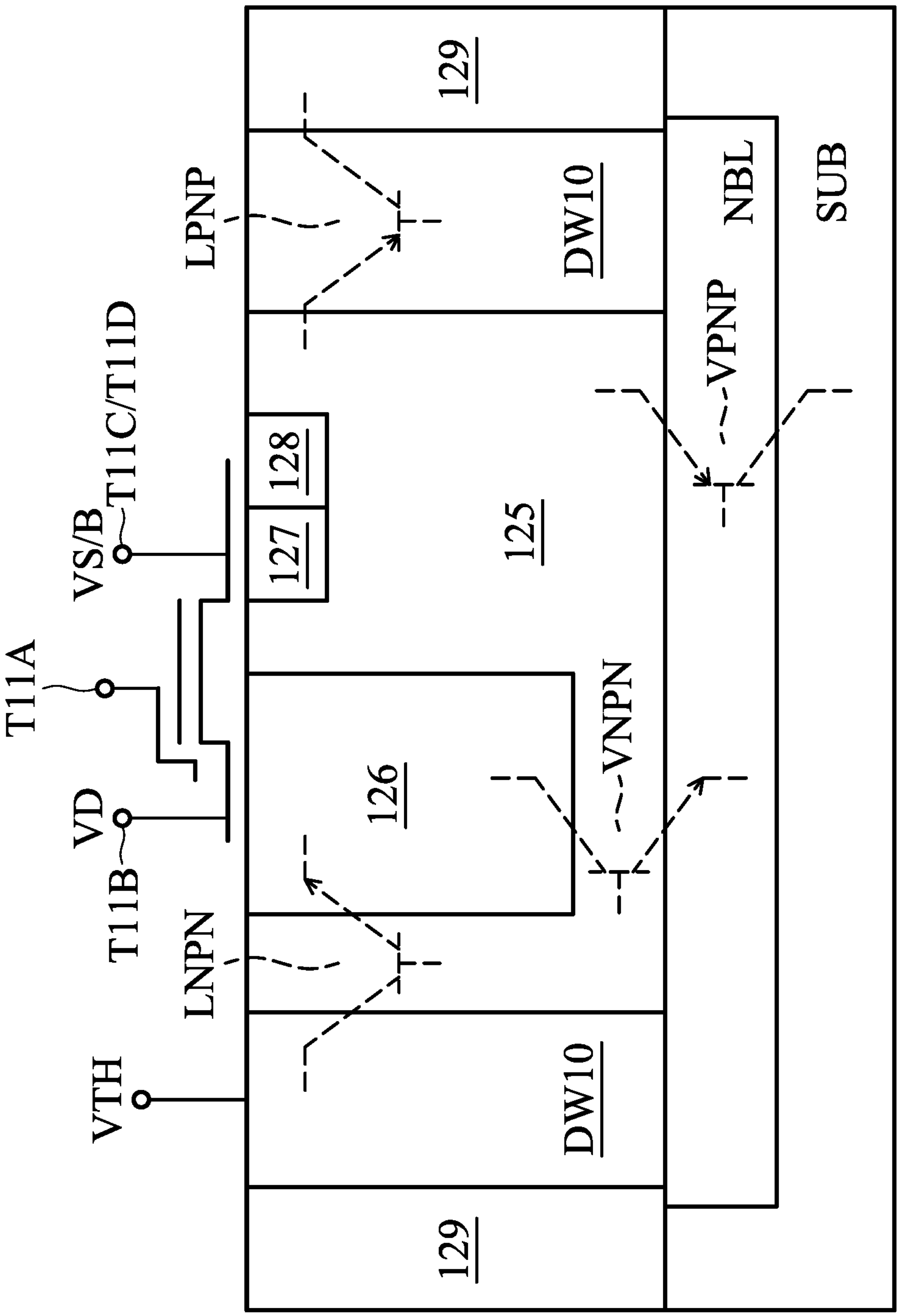
FIG. 12 shows a cross-sectional view showing a structure of a high-voltage-side NMOS transistor in FIG. 1.

FIG. 12 is a cross-sectional view showing a structure of the NMOS transistor 10 on the high-voltage side of FIG. 1. Referring to FIG. 12, the NMOS transistor 11 is formed on a P-type substrate SUB. An N-type buried layer NBL and a P-type well region 129 are formed in the P-type substrate SUB. The N-type isolation deep well region DW10 is formed on the N-type buried layer NBL and is located in the P-type well region 129. A P-type well area 125 is formed in the N-type isolated deep well region DW10. An N-type well region 126 is formed in the P-type well region 125 to serve as the drain region of the NMOS transistor 11. A contact electrode electrically connected to the N-type well region 126 serves as the drain T11B. An N-type doped region 127 is formed in the P-type well region 125 to serve as the source region of the NMOS transistor 11. A P-type doped region 128 is formed in the P-type well region 125 to serve as the bulk region of the NMOS transistor 11. The contact electrodes electrically connected to the N-type doped region 127 and the P-type doped region 128 respectively serve as the source T11C and the bulk T11D. Since the source T11C and the bulk T11D are connected to each other, FIG. 12 only shows a single contact electrode. A gate dielectric layer and a gate layer are formed on the P-well region 125, and a contact electrode electrically connected to the gate layer serves as the gate T11A.

According to the structure of FIG. 12, there are several parasitic bipolar transistors. The parasitic bipolar transistors comprises a parasitic NPN bipolar transistor LNPN which is formed between the N-type isolated deep well region DW10, the P-type well region 125, and the N-type well region 126, a parasitic PNP bipolar transistor LPNP which is formed between the P-type well region 125, the N-type isolated deep well region DW10, and the P-type well region 129, a parasitic NPN bipolar transistor VNPN which is formed between the N-type well region 126, the P-type well region 125, and the N-type buried layer NBL, and a parasitic PNP bipolar transistor VPNP which is formed between the P-type well 125, the N-type buried layer NBL, and the P-type substrate SUB.

As shown in FIG. 12, the N-type isolated deep well region DW10 is not connected to the drain T11B. The voltage of the N-type isolated deep well region DW10 and the voltage of the drain T12B are independent of each other. According to the operation of the voltage tracking circuit 10 described above, the generated output voltage VTH is equal to the one with the higher level among the voltage VD and the voltage VS/B. By applying the output voltage VTH to the N-type isolation deep well region DW10, the parasitic transistors are prevented from being turned on, for example, the parasitic transistors comprise at least one of the following types of transistors: the NPN bipolar transistors LNPN, the parasitic PNP bipolar transistors LPNP, the parasitic NPN bipolar transistors VNPN, and the parasitic PNP bipolar transistor VPNP, however, the present invention is not limited thereto. In one embodiment, none of the above-mentioned parasitic transistors are turned on. For example, when the voltage VS/B is higher than the voltage VD, the voltage tracking circuit 10 generates the output voltage VTH equal to the voltage VS/B, so that the voltage of the N-type isolated deep well region DW10 is close to or equal to the voltage of the N-type buried layer NBL. Therefore, neither the parasitic NPN bipolar transistor VNPN nor the parasitic PNP bipolar transistor VPNP is turned on, which reduces the leakage current through the substrate.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voltage tracking circuit for tracking a first voltage at a first voltage terminal or a second voltage at a second voltage terminal to generate an output voltage, comprising:
   - a first P-type transistor having a gate, a drain, and a source, wherein the drain of the first P-type transistor is coupled to the first voltage terminal;
   - a second P-type transistor having a gate, a drain, and a source, wherein the gate of the second P-type transistor is coupled to the first voltage terminal, and the drain of the second P-type transistor is coupled to the second voltage terminal,
   - a driving circuit, coupled between the first voltage terminal and the gate of the first P-type transistor, generating a driving voltage according to the first voltage, wherein the driving circuit provides the driving voltage to the gate of the first P-type transistor; and
   - a control circuit, coupled to the first voltage terminal and the second voltage terminal, generating a control voltage according to the first voltage and the second voltage,
   - wherein the source of the first P-type transistor and the source of the second P-type transistor are coupled to an output terminal of the voltage tracking circuit, and the output voltage is generated at the output terminal, and
   - wherein in response to the second voltage being higher than the first voltage, the control circuit generates the control signal to turn off the first P-type transistor.

2. The voltage tracking circuit as claimed in claim 1, wherein in response to the second voltage being higher than the first voltage, the second P-type transistor is turned on, and the output voltage is equal to the second voltage.

3. The voltage tracking circuit as claimed in claim 1, wherein the control circuit comprises:
   - a third P-type transistor having a gate, a drain, and a source,
   - wherein the gate of the third P-type transistor is coupled to the first voltage terminal, the drain of the third P-type transistor is coupled to the second voltage terminal, and the source of the third P-type transistor is coupled to the gate of the first P-type transistor.

4. The voltage tracking circuit as claimed in claim 1, wherein in response to the first voltage being higher than or equal to the second voltage, the driving circuit turns on the first P-type transistor using the driving voltage, and the output voltage is equal to the first voltage.

5. The voltage tracking circuit as claimed in claim 1, wherein the driving circuit provides a modulation voltage and reduces the first voltage by the modulation voltage to generate the driving voltage.

6. The voltage tracking circuit as claimed in claim 1, wherein the driving circuit comprises:
   - an input node, coupled to the first voltage terminal to receive the first voltage;
   - an output node coupled to the gate of the first P-type transistor; and
   - a plurality of voltage reducing components connected in series between the input node and the output node.

7. The voltage tracking circuit as claimed in claim 6, wherein the plurality of voltage reducing components comprise:
   - a third P-type transistor having a drain coupled to the input node, a source coupled to a first node, and a gate;
   - a fourth P-type transistor having a drain coupled to the first node, a source coupled to a second node, and a gate; and a fifth P-type transistor having a drain coupled to the second node, a source coupled to the output node, and a gate, wherein the gate of the third P-type transistor, the gate of the fourth P-type transistor, and the gate of the fifth P-type transistor are coupled to the output terminal of the voltage tracking circuit.

8. The voltage tracking circuit as claimed in claim 7, wherein the control circuit comprises:

a sixth P-type transistor having a gate, a drain, and a source, wherein the gate of the sixth P-type transistor is coupled to the first voltage terminal, the drain of the sixth P-type transistor is coupled to the second voltage terminal, and the source of the sixth P-type transistor is coupled to the gate of the first P-type transistor.

9. The voltage tracking circuit as claimed in claim 6, wherein the plurality of voltage reducing components comprise:

a third P-type transistor having a drain coupled to the input node and having a gate and a source both coupled to a first node;

a fourth P-type transistor having a drain coupled to the first node and having a gate and a source both coupled to a second node; and a fifth P-type transistor having a drain coupled to the second node and having a gate and a source both coupled to the output node.

10. The voltage tracking circuit as claimed in claim 9, wherein the control circuit comprises:

a sixth P-type transistor having a gate, a drain, and a source, wherein the gate of the sixth P-type transistor is coupled to the first voltage terminal, the drain of the sixth P-type transistor is coupled to the second voltage terminal, and the source of the sixth P-type transistor is coupled to the gate of the first P-type transistor.

11. The voltage tracking circuit as claimed in claim 6, wherein the plurality of voltage reducing components comprise:

a first diode having an anode terminal coupled to the input node and a cathode terminal coupled to a first node;

a second diode having an anode terminal coupled to the first node and a cathode terminal coupled to a second node; and a third diode having an anode terminal coupled to the second node and a cathode terminal coupled to the output node.

12. The voltage tracking circuit as claimed in claim 11, wherein the control circuit comprises:

a third P-type transistor having a gate, a drain, and a source, wherein the gate of the third P-type transistor is coupled to the first voltage terminal, the drain of the third P-type transistor is coupled to the second voltage terminal, and the source of the third P-type transistor is coupled to the gate of the first P-type transistor.

13. The voltage tracking circuit as claimed in claim 1, further comprising:

a third P-type transistor having a gate, a drain, and a source, wherein the gate of the third P-type transistor is coupled to the first voltage terminal, the drain of the third P-type transistor is coupled to the second voltage terminal, and the source of the third P-type transistor is coupled to the drain of the second P-type transistor.

14. The voltage tracking circuit as claimed in claim 1, wherein in response to an operation of the voltage tracking circuit, the first voltage is maintained at a constant value, and the second voltage is a variable voltage.

15. The voltage tracking circuit as claimed in claim 1, wherein the output voltage is applied to an isolated deep well region surrounding a high-voltage-side element.

16. An electronic circuit comprising:

a high-voltage-side element having a first electrode terminal and a second electrode terminal and surrounded by an isolated deep well region; and a voltage tracking circuit, coupled to the first electrode terminal and the second electrode terminal, tracking a first voltage at the first electrode terminal or a second voltage at the second electrode terminal to generate an output voltage at an output terminal and applying the output voltage to the isolated deep well region surrounding the high-voltage-side element, wherein the voltage tracking circuit comprises:

a first P-type transistor having a gate, a drain, and a source, wherein the drain of the first P-type transistor is coupled to the first electrode terminal;

a second P-type transistor having a gate, a drain, and a source, wherein the gate of the second P-type transistor is coupled to the first electrode terminal, and the drain of the second P-type transistor is coupled to the second electrode terminal, and a control circuit, coupled to the first electrode terminal and the second electrode terminal, generating a control voltage according to the first voltage and the second voltage, wherein the source of the first P-type transistor and the source of the second P-type transistor are coupled to the output terminal of the voltage tracking circuit, and the output voltage is generated at the output terminal, and wherein in response to the second voltage being higher than the first voltage, the control circuit generates the control signal to turn off the first P-type transistor.

17. The electronic circuit as claimed in claim 16, wherein in response to the second voltage being higher than the first voltage, the second P-type transistor is turned on, and the output voltage is equal to the second voltage.

18. The electronic circuit as claimed in claim 16, wherein the control circuit comprises:

a third P-type transistor having a gate, a drain, and a source, wherein the gate of the third P-type transistor is coupled to the first electrode terminal, the drain of the third P-type transistor is coupled to the second electrode terminal, and the source of the third P-type transistor is coupled to the gate of the first P-type transistor.

19. The electronic circuit as claimed in claim 16, further comprising:

a driving circuit, coupled between the first electrode terminal and the gate of the first P-type transistor, providing a modulation voltage, wherein the driving circuit generates a driving voltage according to the first voltage, and wherein the driving circuit reduces the first voltage using the modulation voltage to generate the driving voltage and provides the driving voltage to the gate of the first P-type transistor.

20. The electronic circuit as claimed in claim 19, wherein the driving circuit comprises:

an input node, coupled to the first electrode terminal to receive the first voltage;

an output node coupled to the gate of the first P-type transistor; and a plurality of voltage reducing components connected in series between the input node and the output node.

21. The electronic circuit as claimed in claim 19, wherein in response to the first voltage being higher than or equal to the second voltage, the driving circuit uses the driving voltage to turn on the first P-type transistor, and the output voltage is equal to the first voltage.

22. The electronic circuit as claimed in claim 16, further comprising:

a third P-type transistor having a gate, a drain, and a source, wherein the gate of the third P-type transistor is coupled to the first electrode terminal, the drain of the third P-type transistor is coupled to the second electrode terminal, and the source of the third P-type transistor is coupled to the drain of the second P-type transistor.

* * * * *